United States Patent [19]

Pickle, Jr.

[11] 3,882,898
[45] May 13, 1975

[54] ROTARY VALVE FOR A POSITION SENSING

[75] Inventor: Jack Lamar Pickle, Jr., El Paso, Tex.

[73] Assignee: Farah Manufacturing Company, Inc., El Paso, Tex.

[22] Filed: Aug. 23, 1973

[21] Appl. No.: 390,855

[52] U.S. Cl. .......................................... 137/625.24
[51] Int. Cl. ............................................. F16k 11/00
[58] Field of Search..... 137/625.24, 625.21, 625.22, 137/580; 251/310, 311

[56] References Cited
UNITED STATES PATENTS

| 183,875 | 10/1876 | Van Deren | 137/625.24 |
| 732,588 | 6/1903 | Reuter | 137/625.24 |
| 2,260,979 | 10/1941 | Morin et al. | 137/625.24 |
| 2,313,257 | 3/1943 | Nelson | 137/625.24 |
| 2,749,941 | 6/1956 | Gardner | 137/625.23 |
| 3,296,939 | 1/1967 | Eddy | 137/625.24 X |
| 3,746,045 | 7/1973 | Bunker et al. | 137/625.24 |

FOREIGN PATENTS OR APPLICATIONS

| 795,974 | 6/1958 | United Kingdom | 137/625.24 |

Primary Examiner—Martin P. Schwadron
Assistant Examiner—Robert J. Miller
Attorney, Agent, or Firm—Curtis, Morris & Safford

[57] ABSTRACT

A rotary valve comprising a cylindrical body and a housing having a cylindrical recess in which the body rotates. The body has a pneumatic coupling through which it receives air. A channel through the body can be aligned with a channel in the housing when the body has a certain relative angular orientation with respect to the housing to permit the air to flow through the coupling, the valve body, and the channel through the housing to actuate a sensing device that controls further apparatus. A groove that extends part of the way around the valve body may be formed at the same axial region as the opening from the second channel to communicate with the housing channel, and a second groove that extends completely around the body and communicates with the first-mentioned groove can be provided to connect exhaust ports to exhaust air from the further apparatus when the body and the housing do not have the specific angular orientation to actuate the further apparatus. Furthermore, the body may be divided into a central shaft and a cylindrical shell mounted thereon, so that the shell can be placed in different angular positions to shift the relative angular orientation at which air can flow through the housing and body of the valve to actuate the further apparatus.

5 Claims, 4 Drawing Figures

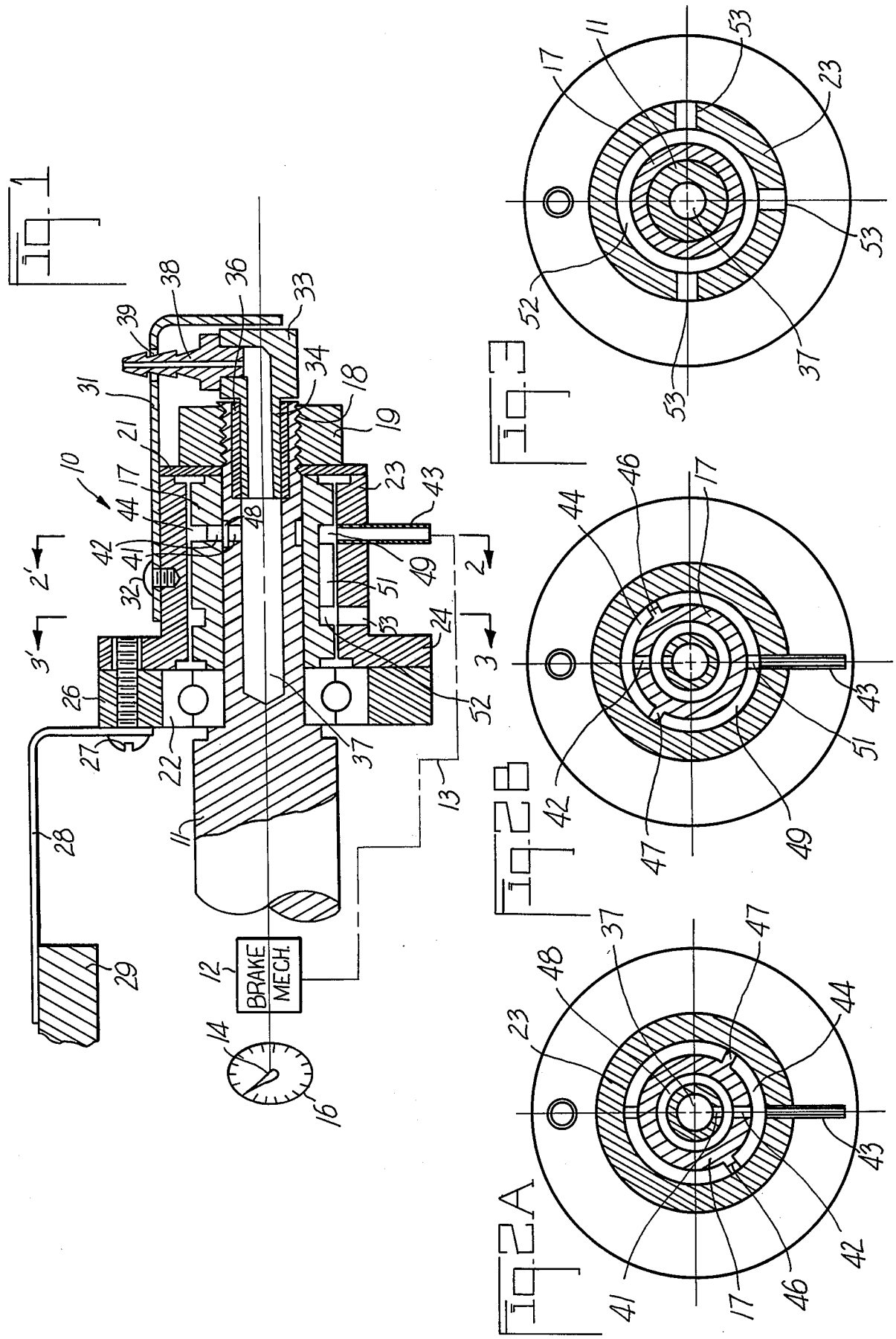

ROTARY VALVE FOR A POSITION SENSING

BACKGROUND OF THE INVENTION

1. Field Of The Invention

This invention relates to the field of rotary valves and particularly to an improved valve for transmitting pneumatic fluid only in a certain relative angular position of the valve body with respect to the housing.

2. The Prior Art

The co-pending application of Breck et al., Ser. No. 264,131, now U.S. Pat. No. 3,805,930, assigned to the assignee of the present application discloses a sewing machine that includes a shaft to drive the needle and a pneumatic valve that actuates a brake mechanism to cause the shaft to stop with the needle in a certain position, usually fully up or fully down. The valve that comprises the present invention is an improvement on the pneumatic valve of Breck et al. application. In the present valve, the pneumatic channels are enclosed so that the flow of air is under better control.

It is one of the objects of the present invention to provide an improved position sensing valve.

Another object is to provide a valve in which the position to be sensed can be adjusted by relative rotation of the valve members, which can then be locked in a new position.

A further object is to provide a rotary sensing valve with enclosed pneumatic passageways but with the relative rotating parts so arranged that it is capable of operating at high speeds.

BRIEF DESCRIPTION OF THE INVENTION

In accordance with the present invention a rotary valve is made to be attached to the end of a rotary shaft. The valve includes a cylindrical body with an axial channel into which a pneumatic coupling is inserted. The coupling must be rotatable with respect to the valve body.

A housing surrounds the valve body closely but with sufficient clearance to allow free relative rotation between the body and the housing. The housing is preferably a materail that has a higher co-efficient of expansion than the body so that heat does not cause the housing to seize the body. A second channel extends through the wall of the body from the axial channel to the outer cylindrical surface facing the inner surface of the housing. A housing channel extends through the housing in the same relative axial location as the second channel so that when, and only when, the valve body and the housing are aligned in one position, air can flow through the coupling, the axial channel, the second channel, and the housing channel, but in other relative angular positions of the valve body and the housing, such flow is cut off. The valve may be included in a pneumatic circuit to actuate some other mechanism when the body and housing are in the aligned position to allow fluid flow therethrough.

Either the housing channel or the second channel may be widened angularly to increase the angular range over which fluid flow can take place. Preferably the widening is done in the valve body, for example, by means of a slot that extends a short distance around the body.

If the apparatus connected to the housing channel is actuated by a pneumatic pressure during one instant when the second channel and the housing channel are aligned, it may be desirable to provide means to relieve the pressure when the valve body is rotated past the point of such alignment. For this purpose a groove may be formed almost around the valve body in the same axial plane as the second channel but separated from the second channel by sections of the wall of the cylindrical valve body. This groove then communicates with the housing channel during most of the rotation of the valve body. An additional groove is preferably formed in the valve body at a different axial plane and extends entirely around the body. Exhaust ports are located in the housing in the same axial plane as the second groove, and an additional groove is formed to connect the second groove with the first groove so that air can flow through the relief ports from the housing channel except when the valve body is in the limited range of positions in which the second channel communicates with the housing channel.

BRIEF DESCRIPTION OF THE DRAWINGS

FIG. 1 is a cross-sectional view of a rotary valve constructed according to the present invention and showing means for attachment to a fixed mechanism having a rotary shaft.

FIGS. 2A and 2B are a cross-section of views of the valve along the line 2–2' at different relative positions of the valve body and housing.

FIG. 3 is a cross-sectional view of the valve along the line 3–3' in FIG. 1.

DESCRIPTION OF THE PREFERRED EMBODIMENT

A rotary positioning valve 10 is shown in FIG. 1 installed at the end of a rotary shaft 11. The shaft may be connected to any of a variety of mechanisms and the valve provides means for actuating pneumatic apparatus when the shaft reaches a certain angular position as it rotates. One simple form of such mechanism is shown illustratively in the form of a brake mechanism 12 connected to the shaft. A needle 14 is also connected to the shaft to rotate with respect to a dial 16 and the brake mechanism is connected by a pneumatic line 13 back to the valve 10 to be controlled thereby so as to stop the shaft 11 when the needle 14 reaches a certain angular position on the dial.

The valve includes a cylindrical body 17 that fits snugly on the shaft 11. The end of the shaft is threaded as indicated by reference numeral 18, and a nut 19 exerts pressure through a washer 21 to hold the cylindrical body 17 in any desired fixed position. The other end of the valve body 17 presses against the inner race of a ball bearing 22 which, in turn, presses against a shoulder on the shaft 11. The shaft, the inner race of the ball bearing, the valve body, the washer 21, and the nut 19 rotate as a unit.

Surrounding the cylindrical body 17 is a housing 23 that has a cylindrical inner recess within which the valve body fits. The housing and valve body are formed with sufficient clearance to allow free relative rotation, but the clearance is kept sufficiently small and leakage paths are relatively long to prevent undesired pneumatic leakage between the valve body 17 and the housing 23. The actual clearance may be of the order of .0005 inch. Such a small clearance would create the possibility of having the housing 23 seize the valve body 17 due to frictional heat since the housing is aluminum with a very hard anodized aluminum surface and the body 17 is hardened steel. However, the aluminum housing 23 has a higher co-efficient of the thermal expansion than the steel body 17 and so expands away from the body 17.

The housing 23 has a flange 24 that is indexed on a retainer ring 26 by any suitable means such as a machine screw 27. The housing, in effect, floats with respect to the body 17, and may even touch it, but because of the previously mentioned differences of expansion, there is no problem from heat. The screw 27 clamps the housing to a bracket 28 which in turn is connected to a fixed part 29 of the machine in which the shaft 11 rotates. While the bracket 28 holds the valve 10 relatively rigidly with respect to the machine part 29, there is still sufficient flexibility in the bracket to allow the ball bearing 22 to align itself with respect to the shaft 11.

A second bracket 31 is attached to the housing 23 by another machine screw 32 and extends beyond the end of the shaft 11 to help support a pneumatic coupling 33. The coupling 33 has a cylindrical end 34 supported in a bearing journal 36 in an axial channel 37 in the shaft 11. The journal 36 permits free relative rotation between the coupling 33 and the shaft 11. The coupling also has a pneumatic connector 38 to receive a pneumatic line, which is not shown. The connector 38 extends through a hole 39 in the bracket 31 so that the entire coupling 33 cannot move either axially or rotationally.

A channel 41 that extends through the wall of the shaft 11 from the axial channel 37 is located in the proper axial position to be aligned with a second channel 42 through the valve body 17, itself. Another channel 43 in the same axial plane extends through the housing 23 so that, when the shaft 11 and the valve body 17 are in the proper angular position, pneumatic fluid can flow through the connector 38, the coupling 33, the axial channel 37, the channels 41 and 42, and the housing channel 43.

FIG. 2A is a cross-sectional view of the valve 10 through the axial plane common to the channels 41-43 and shows the valve body 17 in an angular position in which the channel 42 is aligned with the channel 43. It may not be necessary or even desirable for the relatively small channel 42 to have to be aligned precisely with the relatively small channel 43 in order to permit pneumatic fluid to flow therethrough. As shown in FIG. 2A the channel 42 opens up, at the outer surface of the valve body 17, into a short peripheral slot 44, bounded at each end by sections 46 and 47 of the cylindrical valve body 17. This permits pneumatic fluid to flow through the channels 42 and 43 over a somewhat wider angular range of positions of the valve body 17 within the housing 23. The angular position in which such pneumatic flow may take place may be changed by loosening the nut 19 shown in FIG. 1 and rotating the valve body 17 on the shaft 11. In order not to interrupt the pneumatic flow through the channels 41 and 42, the shaft 11 has an annular groove 48 cut in it. Thus, the pneumatic flow through the axial channel 37 and the channel 41 can still pass through the second channel 42 in the valve body 17 no matter what the relative angular position between the shaft 11 and the valve body 17 may be.

FIG. 2B shows the valve body 17 in a position such that there can be no pneumatic flow between the channels 42 and 43 because any flow would be blocked by the wall sections 47 and 46.

In order to relieve any pressure that may have accumulated in the channel 43 or in other apparatus, such as the brake mechanism 12 connected to it in FIG. 1, venting channels are shown. These include, as shown in FIG. 2B, a groove 49 that extends almost around the valve body 17 and is separated from the groove 44 only by the relatively thin wall sections 47 and 46. As shown in FIG. 1, the groove 49 is in the same axial location as the channels 41-43 and the groove 44. Another groove 51 extends longitudinally along the valve body to connect the groove 49 with another groove 52. As shown in FIG. 3, the groove 52 extends completely around the valve body 17 and is in the same axial plane with three relief ports 53. These ports permit air to flow back through the channel 43 to the groove 49 over a wide range of angular positions of the valve body 17, through the longitudinal groove 51, the annular groove 52, and finally, out through the relief ports 53.

What is claimed is:

1. A rotary valve comprising:
   A. a cylindrical body with an axial channel therethrough, said body having a cylindrical wall;
   B. a pneumatic coupling extending into one end of said channel, said body being rotatable with respect to said coupling;
   C. a second channel in said body extending from said axial channel through an arcuately and axially limited section of the cylindrical wall thereof;
   D. a housing having a cylindrical recess to receive said cylindrical body;
   E. low-friction bearing means supporting said housing from said body to permit free relative rotation between said body and said housing;
   F. a housing channel through said housing extending through the cylindrical wall of said recess to communicate with the second channel; and
   G. a groove in the outer surface of said cylindrical wall extending part of the way around said body in an annular direction and communicating with said second channel to permit pneumatic fluid to pass through said coupling, said axial channel, said second channel, and said housing channel over a limited range of relative rotation at least substantially equal to the included arc of said groove.

2. The valve of claim 1 in which said cylindrical body comprises an arcuate relief groove in the outer surface of the cylindrical wall thereof at the same axial location as said second channel to communicate with said housing channel when said relation of said body and said housing interrupts the communication between said second channel and said housing channel, said relief groove extending only part of the way around said body and terminating in ends separated from said first-named groove by sections of the cylindrical wall of said body.

3. The valve of claim 2 in which:
   A. said housing comprises a relief port extending through the wall of said housing and communicating with the cylindrical wall of said recess; and
   B. said body, comprises:
      1. an annular groove extending completely around said body and axially spaced from said second channel at a position to communicate with said relief port, and
      2. an additional groove extending along said body from said relief groove to said annular groove.

4. The valve of claim 1 in which said axial channel extends through said body, and said valve comprises, in addition:
A. a shaft;
B. an axial channel extending into said shaft;
C. means for mounting said body fixedly on said shaft;
D. bearing means supporting said coupling in the end of said axial channel in said shaft for relative rotation with respect thereto;
E. a passageway extending radially through said shaft and opening into said axial channel therein; and
F. an annular groove in said shaft communicating with said passageway and said second channel when said body is mounted on said shaft, whereby said body can be placed in any selected angular position on said shaft without interrupting the flow of pneumatic fluid through said axial channel in said shaft and said passageway and said second channel.

5. The valve of claim 1 comprising, in addition, attachment means connecting said coupling to said housing to keep said coupling axially and rotationally fixed with respect to said housing.

* * * * *